Patented Dec. 8, 1925.

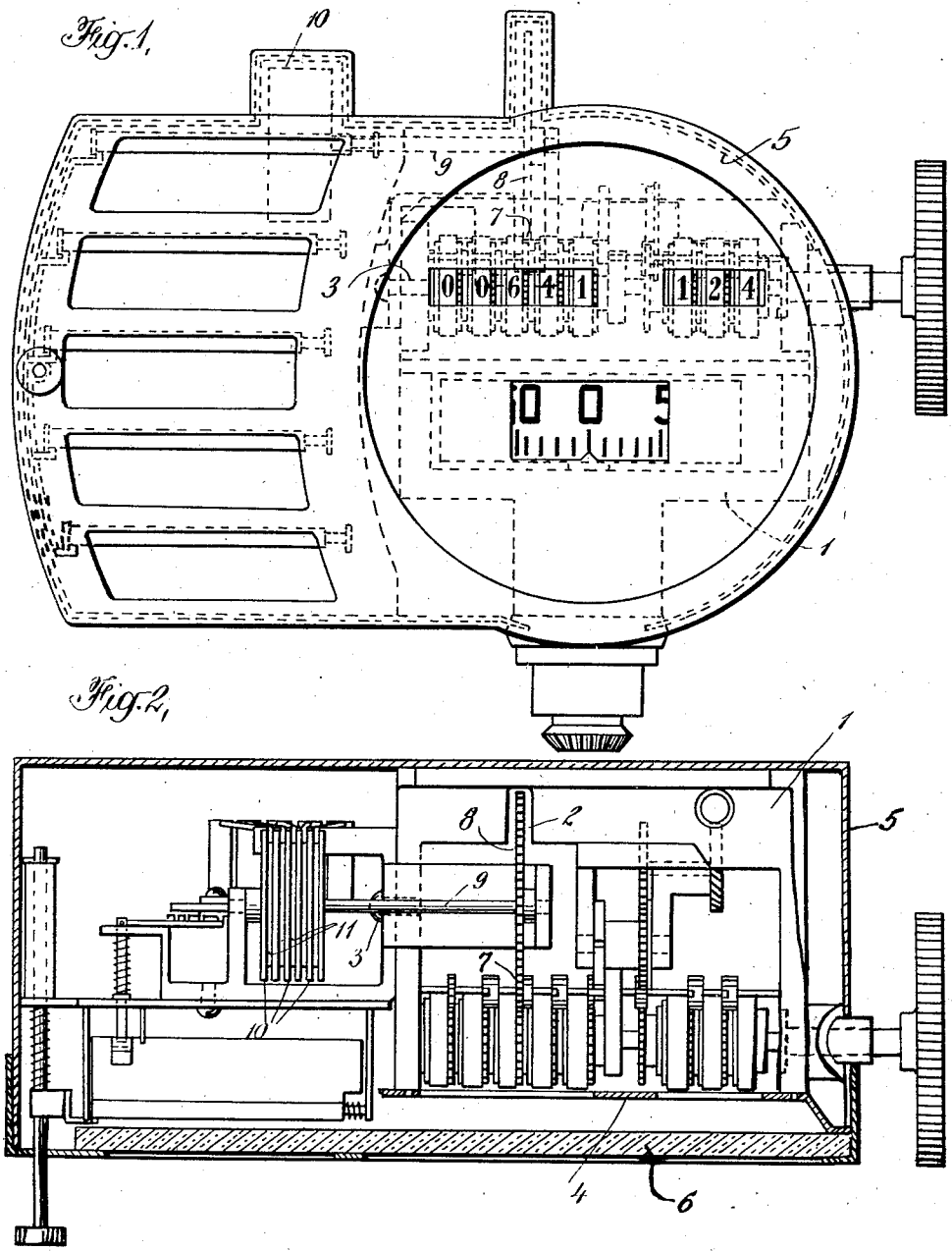

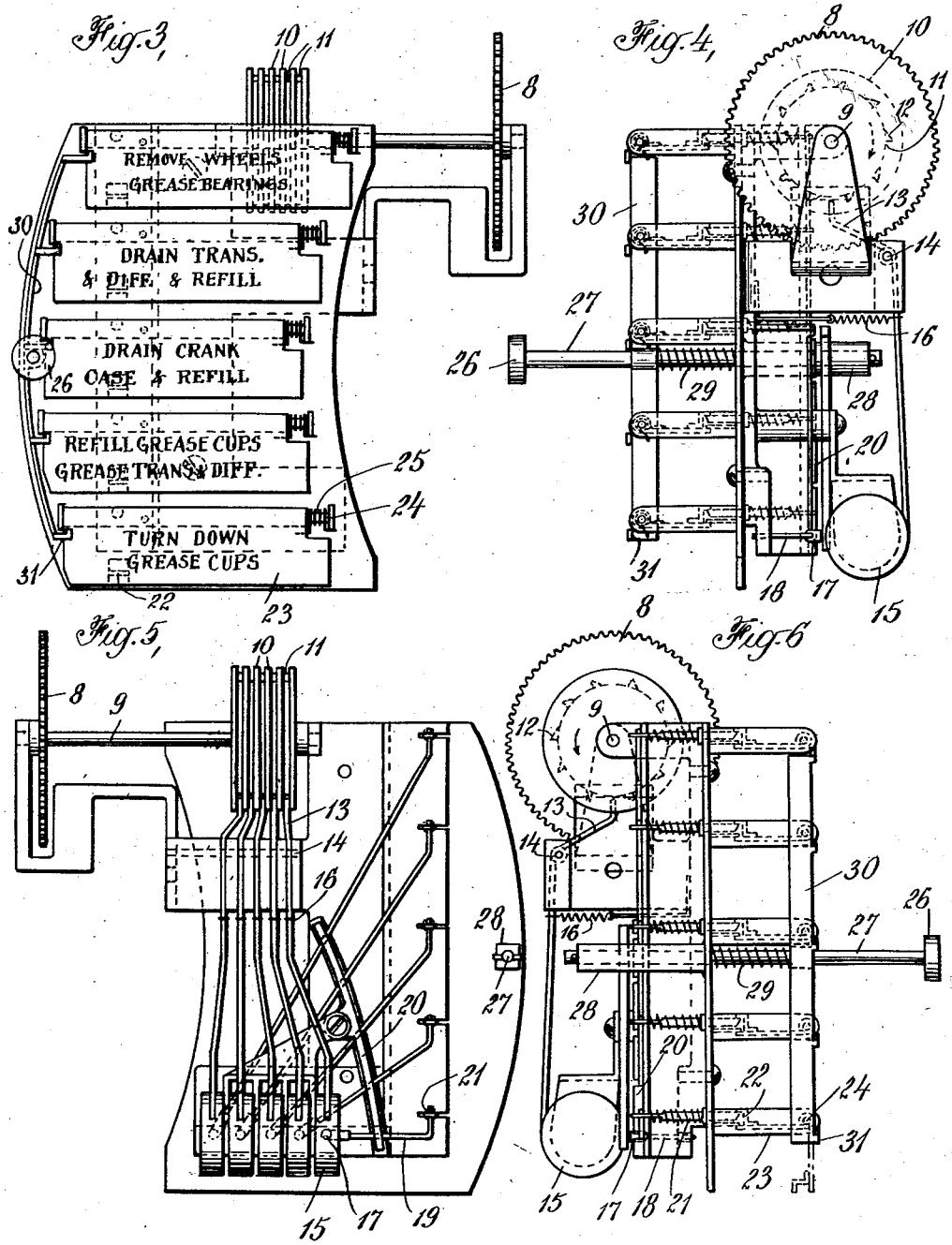

1,564,583

UNITED STATES PATENT OFFICE.

MICHEL V. KOUDRIAVZEFF AND HIPPOLYTE ROMANOFF, OF NEW YORK, N. Y.

SIGNALING DEVICE.

Application filed January 24, 1920. Serial No. 353,744.

*To all whom it may concern:*

Be it known that we, MICHEL V. KOUDRIAVZEFF and HIPPOLYTE ROMANOFF, both citizens of Russia, and both residing at New York, county of New York, and State of New York, have invented certain new and useful Improvements in Signaling Devices; and we do hereby declare the following to be a full, clear, and exact description of the invention, such as will enable others skilled in the art to which it appertains to make and use the same.

Automobiles, tractors and many other kinds of machines are often provided with a cyclometer, and by this we mean a contrivance for recording the revolutions of a wheel as for recording the distance travelled or the work done. Very often, as in the case of automobiles, this cyclometer or recording device forms a part of or is incorporated in the speedometer. In complicated machinery such as automobiles, tractors, locomotives, motor trucks, and the like, certain maintenance operations ought to be carried out at regular intervals dependent ordinarily on the distance covered by the vehicle or by the work done as registered on the recording device or cyclometer. Thus, for instance, with certain types of automobiles the grease cups should be screwed down every 300 miles to insure proper lubrication of certain of the parts. The grease cups should be refilled say every 500 miles. The crank case should be drained and refilled with oil say every 750 miles, and perhaps every 3000 miles the wheels should be removed and the bearings greased. These are but illustrative of certain manual operations that should be performed on complex machinery to keep it in best working condition. Often the person in charge of the machinery either does not know how far or how long it can be run without requiring attention in some particular, or else, through carelessness, the necessary attention is not rendered when due, with resultant injury or resultant impairment and perhaps undue wear of the machinery.

It is an object of the present invention to give warning signals to an operator of an automobile or other machinery to which the present device is applicable whenever any routine attention should be rendered, the arrangement of the apparatus being such that the warning or danger signal will remain conspicuously displayed until by a manual act of the attendant it is put back to its normal position.

To attain this object, advantage is taken of the usual presence on an automobile or like apparatus of a cyclometer or other recording device for by attaching the mechanism of the present invention to the cyclometer through a proper gear, the display of each warning signal will be in a definite relation to the number of revolutions recorded by the cyclometer and consequently in a definite and predetermined relation to the distance covered by the automobile or to the work done by the machinery to which the cyclometer is attached.

We are aware that the signaling device of the present invention is useful in many relations and on many different types of machinery, but for the purpose of making clear the disclosure of one embodiment we have hereinafter described the invention as applied to an automobile which is equipped with a speedometer of common construction. The invention is equally applicable to other types of machinery where in many instances the acts to be performed by the attendant will be other than those of turning down or refilling grease cups and draining crank cases, and the like. The details of the present embodiment will be better understood from the following description, which is to be taken in conjunction with the accompanying drawings, wherein:—

Fig. 1 is a front elevation of the complete device as it appears on the dash board of an automobile;

Fig. 2 is a horizontal section on the line 2—2 of the parts shown in Fig. 1;

Fig. 3 is a front elevation and shows the signaling device detached from the cyclometer and the speedometer;

Fig. 4 is an end vew of the mechanism with casing removed; and

Fig. 5 is a rear elevation of the same.

Fig. 6 is an end view of the machine with casing removed showing the relation of the hammers and latches.

Referring to Figs. 1 and 2, the speedometer, which may be of the Stewart type, has the usual metal frame 1 by which the train of number wheels or counters is supported. To attach the signaling device of the present invention to a Stewart speedometer it is only necessary to mill a slot 2 in frame 1 so that clearance may be had for a large driving gear and to drill and tap a hole for the reception of a screw 3 whereby the signaling device can be rigidly attached to frame 1 (Fig. 2). The speedometer may have its usual front disc or dial 4, but in place of a cylindrical casing to house the rotating parts there is provided a sheet metal box 5 large enough to house both the speedometer and the signaling device. In the front of this box is a protective glass 6 through which the number wheels are visible and behind which the warning signals are from time to time displayed as occasion may require.

As a convenient way of connecting up and driving the signaling device, use is made of the "hundreds" pinion 7 of the cyclometer by bringing into mesh with the rear edge thereof a large gear wheel 8. Any other pinion of the cyclometer would serve the purpose, due account being taken of the gear ratio and of the necessity for a compact structure. Gear 8 is rigidly mounted on a horizontal shaft 9, the ends of which rotate in bearings provided in a casting of irregular outline, the details of which appear in the drawing more clearly than they could here be described. Rigidly mounted on shaft 9 between the series of discs 10 are cam wheels 11 each of which has one or more teeth and is used to actuate a hammer when a signal is to be displayed.

Referring to Figs. 5 and 6 and taking, for purposes of illustration, the outermost cam disc 11 on which there may be ten teeth 12, it will be seen that as gear 8 rotates say two teeth for every hundred miles of travel of the automobile, one of the teeth or cams 12 will, after say 300 miles, engage in its counter-clockwise rotation (Fig. 6) with the free end 13 of a wire lever pivoted at 14 and carrying a relatively heavy cylindrical weight 15 at its other end. Cam 12 on engagement with the end 13 of the wire rocks the wire on pivot 14 against the tension of a coil spring 16, but ultimately releases the wire and permits weight 15 to strike a hammer blow on a releasing mechanism, best shown in Fig. 5.

The releasing mechanism comprises a block 17 mounted at the bend of a wire, one portion 18 of which is adapted to pass with a sliding movement through the main casting of the device to serve as a guide and the other part 19 of which (Fig. 5) passes over a bridge 20 and has its end bent at right angles to engage in the eye of a spring-pressed sliding latch 21 (Fig. 6). Thus, when hammer 15 strikes on block 17, the wire will rock on bridge 20 and pull back the latch against the tension of its spring. Engaging with this latch is a hook 22 carried by a hinged signaling element 23 which, for lack of a better name, may be called a flag. This flag is pivoted at 24 to the main frame and has a coiled spring 25 (Fig. 3) urging it down from the normal position shown in Fig. 1 where the text of the flag is invisible, to the display position of Fig. 3 where the text can be read by the operator. Therefore, when latch 21 is pulled back the flag flies down and the danger signal is given to the operator. By this displayed signal he may be told to turn down the grease cups or to do some other act appropriate to the distance indicated on the cyclometer. After the operator has done what he is thus told to do he may restore the flag to its normal or invisible position by pushing on a thumb button 26 carried on a rod 27 adapted to slide through a hub or guide 28 and against the tension of a spring 29. Attached to this rod is a sheet metal yoke 30 (Fig. 3) from which project fingers 31, one for each flag and adapted on inward movement to engage the front face of the flag and force it back and up against the tension of its spring 25 into the position shown in Fig. 6 with its hook 22 engaged by latch 21.

The other cam discs 11 of which there may be any appropriate number, each actuates a hammer of which five are shown in Fig. 5, though more or less than this number can be used. Each hammer acts on a wire pivoted at bridge 20 and controlling a latch and flag as heretofore described in detail. The inscriptions on the several flags will, of course, vary with the character of the machinery and in the case of an automobile will vary with the make of the car and the particular needs of its component parts, but by way of illustration, using sixty teeth in gear 8 and five cam discs 11 with ten, six, four, three and one teeth, respectively, the flags suited to the more usual type of moderate priced automobiles, might appropriately read as follows:—

| No. teeth. | Legend. | Mileage. |
|---|---|---|
| 10 | Turn down grease cups | 300 |
| 6 | Refill grease cups. Grease transmission and differential | 500 |
| 4 | Drain crank case and refill | 750 |
| 3 | Drain transmission and differential and refill | 1,000 |
| 1 | Remove wheels and grease bearings | 3,000 |

The foregoing are, however, but illustrative and would, of course, be inappropriate if the device were used on an electric automobile or on a locomotive. However, from the foregoing the salient features of the invention would be apparent. The scope of the invention is pointed out with particularity in the following claims.

We claim:

1. The combination with a cyclometer of a hinged signaling element bearing instructions to the operator, a spring urging said element to visible position, releasing mechanism between said element and said cyclometer to permit movement to visible position when the cyclometer counters reach a predetermined position, said releasing mechanism comprising a cam having a geared connection with the cyclometer and including a hammer actuated by said cam and a catch controlled by said hammer; substantially as described.

2. The combination with a cyclometer of a plurality of hinged flags at the side thereof, manually operable means for moving said flags to render invisible inscriptions borne thereby, and means geared to said cyclometer for releasing said flags at times appropriate to successive predetermined settings of the cyclometer counters; substantially as described.

3. The combination with a cyclometer of a signal element, means for displaying it at a predetermined indication of said cyclometer, an additional signal element, means for displaying it at a predetermined indication of said cyclometer, and means for having more than one signal element in the display position at the same time.

4. The combination with a cyclometer, a plurality of signaling elements controlled thereby and movable into visible position, and manually operable means for restoring said elements to invisible position when desired.

5. In combination with an odometer train, a visual signal including a movable target adapted to display or conceal said signal, means operative to move said target normally to display such signal, means for holding said target in position to conceal said signal, manually operable means for setting the same, and means operated by the odometer train for rendering said holding means inoperative, thereby moving said target to display said signal upon the completion of the odometer train of a predetermined mileage.

6. In combination with an odometer train, a visual signal including a movable target adapted to display or conceal said signal, means operative to move said target normally to display said signal, a spring operated catch for locking said target in position to conceal said signal, manually operable means for setting the same, and means operated by the odometer train for disengaging said catch, thereby moving said target to display said signal upon the completion of the odometer train of a predetermined mileage record.

In testimony whereof, we affix our signatures.

MICHEL V. KOUDRIAVZEFF.
HIPPOLYTE ROMANOFF.